US009733958B2

(12) United States Patent
Cui et al.

(10) Patent No.: US 9,733,958 B2
(45) Date of Patent: *Aug. 15, 2017

(54) MECHANISM FOR PERFORMING ROLLING UPDATES WITH DATA UNAVAILABILITY CHECK IN A NETWORKED VIRTUALIZATION ENVIRONMENT FOR STORAGE MANAGEMENT

(71) Applicant: Nutanix, Inc., San Jose, CA (US)

(72) Inventors: Miao Cui, Sunnyvale, CA (US); Robert William Schwenz, Campbell, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/278,363

(22) Filed: May 15, 2014

(65) Prior Publication Data

US 2016/0203008 A1 Jul. 14, 2016

(51) Int. Cl.
*G06F 9/44* (2006.01)
*G06F 9/455* (2006.01)
*H04L 29/08* (2006.01)
*G06F 15/173* (2006.01)
*G06F 9/50* (2006.01)
*G06F 9/445* (2006.01)

(52) U.S. Cl.
CPC ............ *G06F 9/455* (2013.01); *G06F 8/65* (2013.01); *G06F 9/50* (2013.01); *G06F 15/173* (2013.01); *H04L 67/1002* (2013.01); *H04L 67/1097* (2013.01); *G06F 9/45533* (2013.01); *G06F 2009/4557* (2013.01)

(58) Field of Classification Search
CPC ........... G06F 8/65; G06F 9/455; G06F 15/173

USPC ......................... 717/172, 176, 177, 168–178
See application file for complete search history.

(56) References Cited

U.S. PATENT DOCUMENTS

| | | | | |
|---|---|---|---|---|
| 5,253,252 A * | 10/1993 | Tobol | ........................... | 370/452 |
| 5,884,308 A * | 3/1999 | Foulston | | |
| 6,363,416 B1 * | 3/2002 | Naeimi et al. | ............... | 709/209 |
| 6,684,397 B1 * | 1/2004 | Byer et al. | .................... | 717/174 |
| 6,738,801 B1 * | 5/2004 | Kawaguchi et al. | ......... | 709/208 |
| 6,928,589 B1 * | 8/2005 | Pomaranski et al. | ........ | 714/47.2 |
| 7,379,419 B2 * | 5/2008 | Collins | ........................ | 370/217 |
| 7,421,578 B1 | 9/2008 | Huang et al. | | |
| 7,461,374 B1 * | 12/2008 | Balint et al. | .................. | 717/174 |
| 7,720,864 B1 * | 5/2010 | Muth et al. | .................... | 707/785 |
| 7,934,117 B2 * | 4/2011 | Kakivaya et al. | ............ | 714/4.1 |
| 7,937,455 B2 * | 5/2011 | Saha et al. | .................... | 709/220 |
| 7,990,962 B2 * | 8/2011 | Chang et al. | ................. | 370/390 |

(Continued)

FOREIGN PATENT DOCUMENTS

WO    WO 2014200564 A1 * 12/2014

OTHER PUBLICATIONS

Ajmani et al., "Scheduling and Simulation: How to Upgrade Distributed Systems," HotOS IX: The 9th Workshop on Hot Topics in Operating Systems, USENIX, 2003, pp. 43-48.*

(Continued)

*Primary Examiner* — Wei Zhen
*Assistant Examiner* — Andrew M Lyons
(74) *Attorney, Agent, or Firm* — Vista IP Law Group, LLP

(57) ABSTRACT

A method for performing rolling updates with data unavailability checks in a networked virtualization environment for storage management.

42 Claims, 8 Drawing Sheets

(56) References Cited

U.S. PATENT DOCUMENTS

| | | | | |
|---|---|---|---|---|
| 8,051,252 | B2* | 11/2011 | Williams | 711/154 |
| 8,051,262 | B2 | 11/2011 | Ichikawa et al. | |
| 8,392,680 | B1* | 3/2013 | Natanzon | G06F 11/1469 |
| | | | | 711/161 |
| 8,424,003 | B2* | 4/2013 | Degenaro et al. | 718/101 |
| 8,473,775 | B1* | 6/2013 | Helmick | G06F 11/00 |
| | | | | 707/623 |
| 8,479,056 | B2* | 7/2013 | Andrews et al. | 714/47.1 |
| 8,522,243 | B2* | 8/2013 | Ventroux et al. | 718/103 |
| 8,549,518 | B1 | 10/2013 | Aron | |
| 8,601,471 | B2 | 12/2013 | Beaty | |
| 8,601,473 | B1 | 12/2013 | Aron et al. | |
| 8,850,130 | B1 | 9/2014 | Aron et al. | |
| 8,898,668 | B1* | 11/2014 | Costea | G06F 9/45558 |
| | | | | 709/203 |
| 9,009,106 | B1 | 4/2015 | Aron et al. | |
| 9,032,248 | B1 | 5/2015 | Petty | |
| 9,286,344 | B1 | 3/2016 | Bhardwaj et al. | |
| 9,389,887 | B1* | 7/2016 | Aron | G06F 9/45533 |
| 2002/0133491 | A1 | 9/2002 | Sim et al. | |
| 2005/0210461 | A1* | 9/2005 | Srivastava | G06F 8/67 |
| | | | | 717/170 |
| 2005/0268298 | A1 | 12/2005 | Hunt et al. | |
| 2006/0174238 | A1* | 8/2006 | Henseler et al. | 717/168 |
| 2006/0174243 | A1* | 8/2006 | Brewer et al. | 717/174 |
| 2007/0234332 | A1* | 10/2007 | Brundridge et al. | 717/168 |
| 2009/0113034 | A1 | 4/2009 | Krishnappa et al. | |
| 2009/0144720 | A1* | 6/2009 | Roush | G06F 8/65 |
| | | | | 717/171 |
| 2010/0042869 | A1* | 2/2010 | Szabo | G06F 8/67 |
| | | | | 714/4.1 |
| 2010/0110150 | A1* | 5/2010 | Xu | B41J 2/09 |
| | | | | 347/77 |
| 2010/0162226 | A1* | 6/2010 | Borissov | G06F 8/67 |
| | | | | 717/173 |
| 2010/0262717 | A1 | 10/2010 | Critchley | |
| 2010/0293541 | A1* | 11/2010 | Pall et al. | 717/178 |
| 2011/0099266 | A1* | 4/2011 | Calder et al. | 709/224 |
| 2011/0107135 | A1* | 5/2011 | Andrews | G06F 8/67 |
| | | | | 714/2 |
| 2011/0154317 | A1* | 6/2011 | Madduri et al. | 717/174 |
| 2011/0173493 | A1* | 7/2011 | Armstrong | G06F 11/2046 |
| | | | | 714/4.12 |
| 2011/0184993 | A1* | 7/2011 | Chawla | G06F 9/45533 |
| | | | | 707/802 |
| 2012/0078948 | A1 | 3/2012 | Darcy | |
| 2012/0079474 | A1* | 3/2012 | Gold et al. | 717/173 |
| 2012/0110150 | A1* | 5/2012 | Kosuru et al. | 709/221 |
| 2012/0233608 | A1 | 9/2012 | Toeroe | |
| 2012/0243795 | A1* | 9/2012 | Head | H04N 19/507 |
| | | | | 382/218 |
| 2012/0254342 | A1 | 10/2012 | Evans | |
| 2012/0266231 | A1 | 10/2012 | Spiers et al. | |
| 2012/0311557 | A1* | 12/2012 | Resch | 717/171 |
| 2012/0317142 | A1 | 12/2012 | Broecheler et al. | |
| 2013/0007741 | A1* | 1/2013 | Britsch | G06F 9/4401 |
| | | | | 718/1 |
| 2013/0036323 | A1 | 2/2013 | Goose et al. | |
| 2013/0138995 | A1 | 5/2013 | Sivaramakrishnan et al. | |
| 2013/0174246 | A1 | 7/2013 | Schrecker et al. | |
| 2013/0219030 | A1 | 8/2013 | Szabo | |
| 2013/0227550 | A1 | 8/2013 | Weinstein et al. | |
| 2013/0304694 | A1 | 11/2013 | Barreto et al. | |
| 2013/0332771 | A1 | 12/2013 | Salapura et al. | |
| 2014/0052877 | A1 | 2/2014 | Mao | |
| 2014/0068612 | A1 | 3/2014 | Torrey | |
| 2014/0101649 | A1* | 4/2014 | Kamble | G06F 9/45558 |
| | | | | 717/170 |
| 2014/0109172 | A1 | 4/2014 | Barton et al. | |
| 2014/0196056 | A1* | 7/2014 | Kottomtharayil et al. | 718/105 |
| 2014/0222953 | A1* | 8/2014 | Karve | G06F 9/455 |
| | | | | 709/217 |
| 2015/0244802 | A1 | 8/2015 | Simoncelli | |
| 2015/0326531 | A1 | 11/2015 | Cui et al. | |
| 2015/0347775 | A1* | 12/2015 | Bie | G06F 21/6218 |
| | | | | 707/782 |
| 2016/0204977 | A1 | 7/2016 | Cui et al. | |

OTHER PUBLICATIONS

Kochut, Andrzej and Alexei Karve, "Leveraging Local Image Redundancy for Efficient Virtual Machine Provisioning," 2012 IEEE Network Operations and Management Symposium, Jun. 8, 2012, pp. 171-178.*

Soules et al.; "Metadata Efficiency in a Comprehensive Versioning File System", May 2002, CMU-CS-02-145, School of Computer Science, Carnegie Mellon University, Pittsburgh, PA 15213, 33 pages.*

Non-final Office Action dated Jul. 16, 2015 for related U.S. Appl. No. 14/584,466.

International Search Report and Written Opinion dated Aug. 20, 2015, for related PCT Patent Application No. PCT/US15/31096, 8 pages.

International Search Report and Written Opinion dated Aug. 26, 2015, for related PCT Patent Application No. PCT/US15/31096, 8 pages.

Final Office Action dated Feb. 25, 2016 for related U.S. Appl. No. 14/584,466.

Notice of Allowance and Fee(s) due dated Jul. 19, 2016 for related U.S. Appl. No. 14/206,869.

Lamport, Leslie "Paxos Made Simple," dated Nov. 1, 2001, 14 pages.

Alexander Shraer, et al., "Dynamic Reconfiguration of Primary/Backup Clusters," dated 2011, 13 pages.

Notice of Allowance and Fee(s) due dated Oct. 30, 2015 for related U.S. Appl. No. 14/144,520.

Wikipedia, "Compare-and-swap," Nov. 9, 2015, 6 pages.

International Search Report and Written Opinion dated Aug. 7, 2015, for corresponding PCT Patent Application No. PCT/US2015/030026, 10 pages.

Non-final Office Action dated Jul. 17, 2015 for related U.S. Appl. No. 14/206,869.

PCT International Search Report and Written Opinion dated Jun. 15, 2015 for related PCT Patent Application No. PCT/US2015/020139.

Final Office Action dated Jan. 25, 2016 for related U.S. Appl. No. 14/206,869.

Non-final Office Action dated Sep. 22, 2016 for related U.S. Appl. No. 14/584,466.

Citrix, "Citrix XenServer 6.0 Administrator's Guide", Copyright 2012 Citrix Systems, Inc., 207 pages.

John L Hufferd, Hufferd Enterprises, SNIA "IP Storage Protocols: iSCSI", Copyright 2011 Storage Networking Industry Association, 46 pages.

VMware, Technical White Paper, "Multipathing Configuration for Software iSCSI Using Port Binding", Copyright 2012 Vmware, Inc., 15 pages.

Notice of Allowance and Fee(s) due dated Oct. 24, 2016 for related U.S. Appl. No. 14/206,869.

Non-final Office Action dated Nov. 1, 2016 for related U.S. Appl. No. 14/708,091.

Notice of Allowance and Fee(s) due dated Apr. 5, 2017 for related U.S. Appl. No. 14/584,466.

Kochut, Andrzej and Alexei Karve, "Leveraging Local Image Redundancy for Efficient Virtual Machine Provisioning," 2012 IEEE Network Operations and Management Symposium, Jun. 8, 2012, pp. 179-187.

Final Office Action dated Apr. 20, 2017 for related U.S. Appl. No. 14/708,091.

Notice of Allowance and Fee(s) due dated May 15, 2017 for related U.S. Appl. No. 15/069,961.

Non-Final Office Action dated Jan. 26, 2017 for related U.S. Appl. No. 15/069,961.

* cited by examiner

MECHANISM FOR PERFORMING ROLLING UPDATES WITH DATA UNAVAILABILITY CHECK IN A NETWORKED VIRTUALIZATION ENVIRONMENT FOR STORAGE MANAGEMENT

CROSS REFERENCE TO RELATED APPLICATIONS

The present application is related to U.S. Pat. No. 8,601,473, entitled "ARCHITECTURE FOR MANAGING I/O AND STORAGE FOR A VIRTUALIZATION ENVIRONMENT", U.S. patent application Ser. No. 13/207,357, entitled "METADATA FOR MANAGING I/O AND STORAGE FOR A VIRTUALIZATION ENVIRONMENT", U.S. Pat. No. 8,549,518, entitled "METHOD AND SYSTEM FOR IMPLEMENTING A MAINTENANCE SERVICE FOR MANAGING I/O AND STORAGE FOR A VIRTUALIZATION ENVIRONMENT", which are all hereby incorporated by reference in their entirety.

FIELD

This disclosure concerns a mechanism for performing rolling updates in a networked virtualization environment for storage management.

BACKGROUND

In a networked virtualization environment for storage management, several nodes (e.g., servers, data centers) share a plurality of storage devices over a network. Each node may include local storage devices (e.g., solid state drive (SSD)) and the networked virtualization environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

Each node may host several user virtual machines, and virtual disks may be exposed by a node to its corresponding user virtual machines. In order to provide optimal storage management functionality to user virtual machines running within the networked virtualization environment, updates may be performed periodically at the nodes of the networked virtualization environment to ensure that the most current version of storage management functionality is available to the user virtual machines. To complete an update for a node in the networked virtualization environment, the node must be shut down or restarted for a period of time, where data residing at the node is unavailable during that portion of the update process. For the networked virtualization environment for storage management to continue operating without error, it must be ensured that data that is unavailable at a node currently undergoing an update process may be accessed at some other location within the networked virtualization environment.

Therefore, what is needed is a mechanism for performing a rolling update with a data unavailability check in a networked virtualization environment for storage management.

SUMMARY

Embodiments of the present invention provide a mechanism for performing rolling updates with data unavailability check in a networked virtualization environment for storage management.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

Embodiments of the present invention provide a mechanism for performing rolling updates with data unavailability check in a networked virtualization environment for storage management.

In a networked virtualization environment for storage management, several nodes (e.g., servers, data centers) share a plurality of storage devices over a network. Each node may include local storage devices (e.g., solid state drive (SSD)) and the networked virtualization environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

Figure 1:
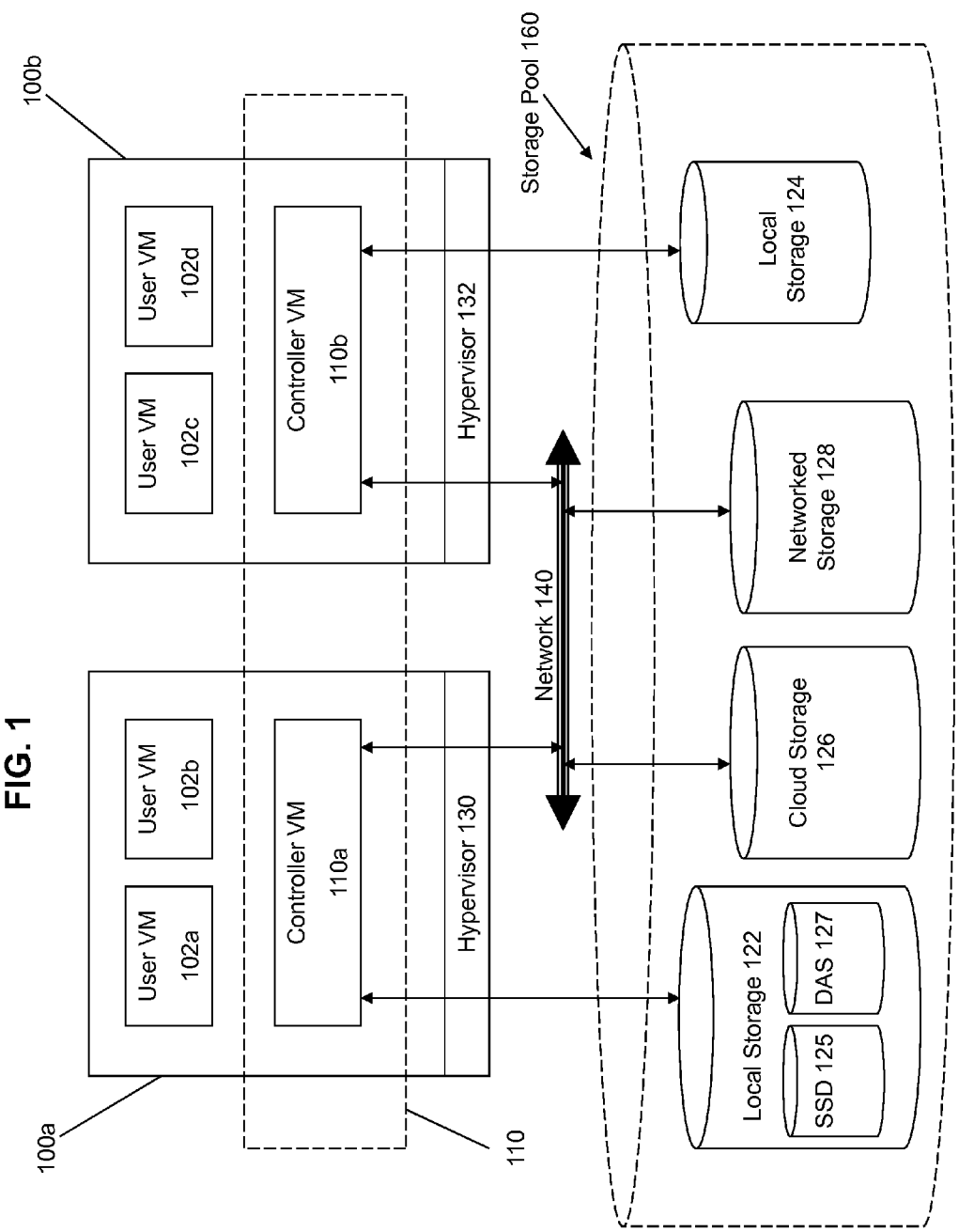
FIG. 1 illustrates an example architecture to implement I/O and storage device management in a virtualization environment according to some embodiments of the invention.

FIG. 1 illustrates an architecture for implementing storage management in a virtualization environment according to some embodiments of the invention. The architecture of FIG. 1 can be implemented for a distributed platform that contains multiple servers 100a and 100b that manages multiple-tiers of storage. The multiple tiers of storage includes storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Controller VM". This is the "Storage Controller" in the currently described architecture. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption, and compression. The new architecture massively parallelizes storage, by placing a storage controller—in the form of a Controller VM—at each hypervisor, and thus makes it possible to render enough CPU and memory resources to achieve the aforementioned optimizations.

Additional details regarding networked virtualization environments for storage management are described in U.S. Pat. No. 8,601,473, entitled "Architecture for Managing I/O and Storage for a Virtualization Environment", which is hereby incorporated by reference in its entirety.

As mentioned above, each node may host several user virtual machines, and virtual disks may be exposed by a node to its corresponding user virtual machines. In order to provide optimal storage management functionality to user virtual machines running within the networked virtualization environment, updates may be performed periodically at the nodes of the networked virtualization environment to ensure that the most current version of storage management functionality is available to the user virtual machines. To complete an update for a node in the networked virtualization environment, the node must be shut down or restarted for a period of time, where data residing at the node is unavailable during that portion of the update process. For the networked virtualization environment for storage management to continue operating without error, it must be ensured that data that is unavailable at a node currently undergoing an update process may be accessed at some other location within the networked virtualization environment.

As noted above, the Controller VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will includes its own Controller VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Controller VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 2:
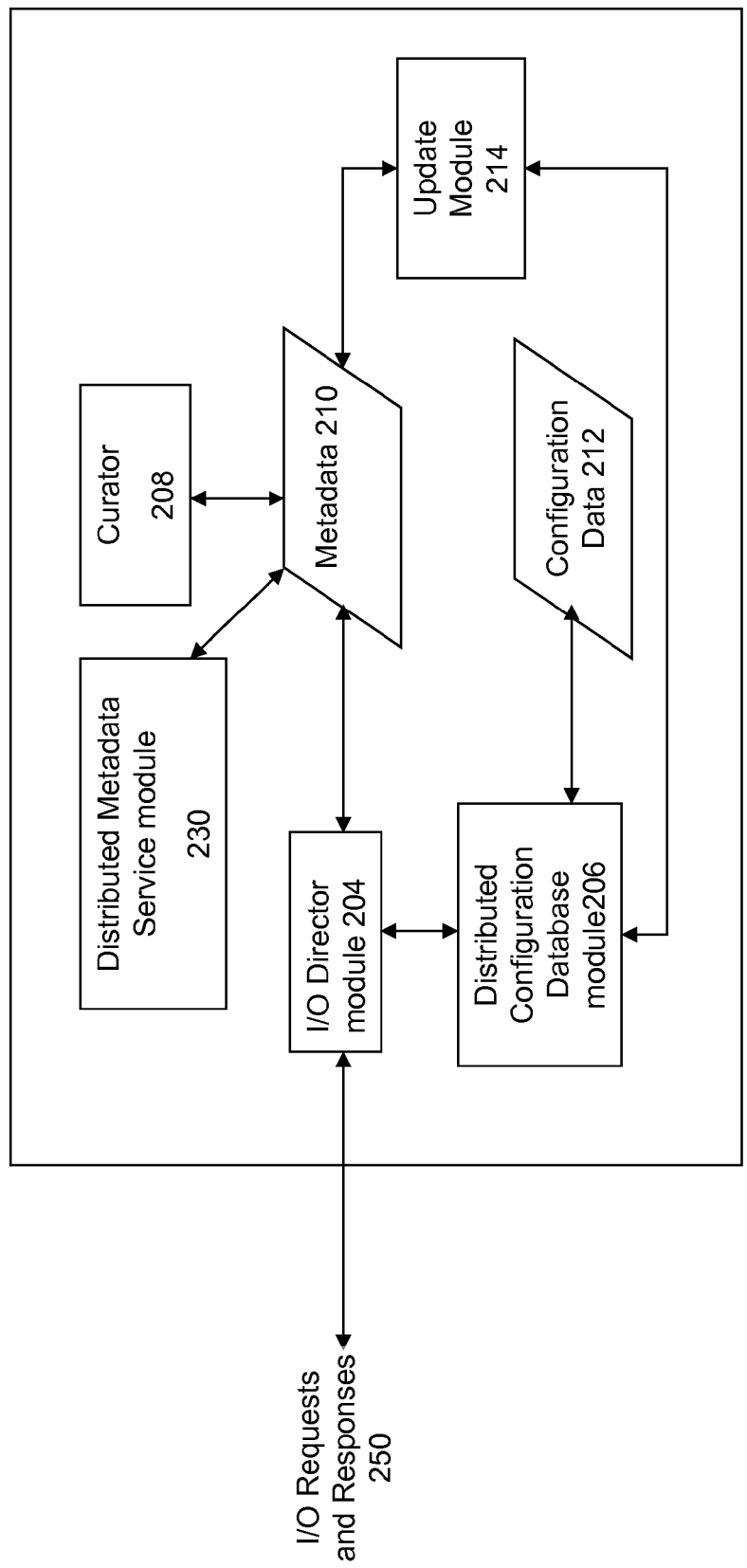
FIG. 2 illustrates the components of a Controller VM according to some embodiments of the invention.

In addition to handling storage tasks for the networked virtualization environment, the Controller VMs residing at each node may also be utilized to implement the mechanism for performing rolling updates with data unavailability check. FIG. 2 illustrates the internal structures of a Controller VM according to some embodiments of the invention. As previously noted, the Controller VMs are not formed as part of specific implementations of hypervisors. Instead, the Controller VMs run as virtual machines above hypervisors on the various nodes. Since the Controller VMs run above the hypervisors, this means that the current approach can be used and implemented within any virtual machine architecture, since the Controller VMs of embodiments of the invention can be used in conjunction with any hypervisor from any virtualization vendor. Therefore, the Controller VM can be configured to operate ubiquitously anywhere within the computing environment, and will not need to be custom-configured for each different type of operating environment. This is particularly useful because the industry-standard iSCSI or NFS protocols allow the Controller VM to be hypervisor-agnostic.

The main entry point into the Controller VM is the central controller module 204 (which is referred to here as the "I/O Director module 204"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the Controller VM's kernel. This write would be intercepted by the I/O Director module 204 running in user space. I/O Director module 204 interprets the iSCSI LUN or the NFS file destination and converts the request into an internal "vDisk" request (e.g., as described in more detail below). Ultimately, the I/O Director module 204 would write the data to the physical storage.

Each vDisk managed by a Controller VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 210 is maintained by the Controller VM to track and handle the vDisks and the data and storage objects in the system that pertain to the vDisks. The Metadata 210 is used to track and maintain the contents of the vDisks and vDisk blocks.

In order to determine where to write and read data from the storage pool, the I/O Director module 204 communicates with a Distributed Metadata Service module 230 that maintains all the metadata 210. In some embodiments, the Distributed Metadata Service module 230 is a highly available, fault-tolerant distributed service that runs on all the Controller VMs in the appliance. The metadata managed by Distributed Metadata Service module 230 is itself kept on the persistent storage attached to the appliance. According to some embodiments of the invention, the Distributed Metadata Service module 230 may be implemented on SSD storage.

Since requests to the Distributed Metadata Service module 230 may be random in nature, SSDs can be used on each server node to maintain the metadata for the Distributed Metadata Service module 230. The Distributed Metadata Service module 230 stores the metadata that helps locate the actual content of each vDisk block. If no information is found in Distributed Metadata Service module 230 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing Metadata 210 are described below and in co-pending U.S. application Ser. No. 13/207,357, which is hereby incorporated by reference in its entirety.

A health management module 208 (which may hereinafter be referred to as a "Curator") is employed to address and cure any inconsistencies that may occur with the Metadata 210. The Curator 208 oversees the overall state of the virtual storage system, and takes actions as necessary to manage the health and efficient performance of that system. According to some embodiments of the invention, the curator 208 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 208 are disclosed in U.S. Pat. No. 8,549,518, which is hereby incorporated by reference in its entirety.

Some of the Controller VMs also includes a Distributed Configuration Database module 206 to handle certain administrative tasks. The primary tasks performed by the Distributed Configuration Database module 206 are to maintain configuration data 212 for the Controller VM and act as a notification service for all events in the distributed system. Examples of configuration data 212 include, for example, (1) the identity and existence of vDisks; (2) the identity of Controller VMs in the system; (3) the physical nodes in the system; (4) the physical storage devices in the system; and (5) information pertaining to updates and updates available for the system.

For example, assume that there is a desire to add a new physical disk to the storage pool. The Distributed Configuration Database module 206 would be informed of the new physical disk, after which the configuration data 212 is updated to reflect this information so that all other entities in the system can then be made aware for the new physical disk. In a similar way, the addition/deletion of vDisks, VMs and nodes would handled by the Distributed Configuration Database module 206 to update the configuration data 212 so that other entities in the system can be made aware of these configuration changes. As another example, whenever a update is available for the system, the Distributed Configuration Database module 206 would be informed of the update, after which the configuration data 212 is updated to reflect this information so that all other entities in the system can then be made aware of the existence of the update.

Another task that is handled by the Distributed Configuration Database module 206 is to maintain health information for entities in the system, such as the Controller VMs. If a Controller VM fails or otherwise becomes unavailable, then this module tracks this health information so that any management tasks required of that failed Controller VM can be migrated to another Controller VM.

The Distributed Configuration Database module 306 also handles elections and consensus management within the system. Another task handled by the Distributed Configuration Database module is to implement ID creation. Unique IDs are generated by the Distributed Configuration Database module as needed for any required objects in the system, e.g., for vDisks, Controller VMs, extent groups, etc. In some embodiments, the IDs generated are 64-bit IDs, although any suitable type of IDs can be generated as appropriate for embodiments to the invention. According to some embodiments of the invention, the Distributed Configuration Database module 306 may be implemented on a SSD storage because of the real-time guarantees required to monitor health events.

Each Controller VM may also include an update module 214 for facilitating the performance of rolling updates to the networked virtualization environment. In some embodiments, the update module 214 is a highly available, fault-tolerant distributed service that runs on all the Controller VMs in the appliance. The update module 214 may be tasked with the responsibility of notifying the system of an update, identifying the existence of update data, performing the installation of the update data, and also performing a data unavailability check to ensure that data for the networked virtualization environment is available during the rolling update, all of which will be discussed in greater detail below.

In order to facilitate the update module 214 in performing its set of duties, the update module 214 is provided access to the metadata 210 as well as configuration data 212. As illustrated in FIG. 2, the update module 214 is provided direct access to metadata 210 and is provided indirect access to the configuration data 212 through the distributed configuration database module 206. However, it is important to note, that the update module 214 may also be provided indirect access to the metadata 210 through other modules in the controller VM (e.g., distributed metadata service module 230). Likewise, the update module 214 may be provided direct access to the configuration data 212.

Figure 3:
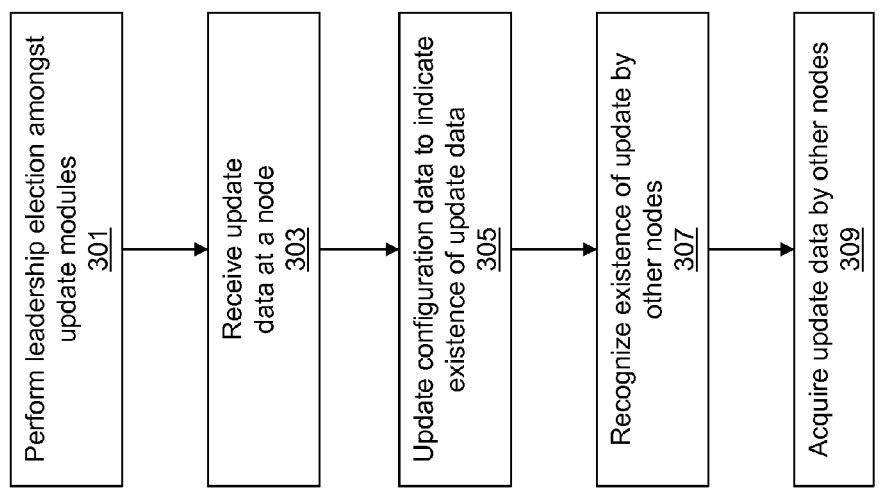
FIG. 3 is a flow diagram illustrating a method for acquiring update data for a rolling update of the networked virtualization environment for storage management.

FIG. 3 is a flow diagram illustrating a method for acquiring update data for a rolling update of the networked virtualization environment for storage management. The method described in FIG. 3 illustrates only a portion of the process for performing a rolling update of the networked virtualization environment, namely the process of performing a leadership election amongst the update modules and the process of acquiring update data by all of the nodes in the networked virtualization environment.

Initially, a leadership election is performed amongst all of the update modules in the networked virtualization environment as shown at 301. During the leadership election, a master update module is elected. The remaining update modules in the system act as slave update modules. The master update module is responsible for managing the completion of update data installation for all other update modules in the networked virtualization environment. In some embodiments, the master update module may maintain one or more tokens, which it may provide to other update modules in the networked virtualization environment to allow for the those update modules to complete installation of update version data for its corresponding node, which will be described in greater detail below. This ensures that only a prescribed number of nodes within the networked virtualization environment are being shut down or restarted at a given time.

In some embodiments, the master update module may also be responsible for performing data unavailability checks on nodes requesting to complete installation of update version data. In such circumstances, before the master update module grants a request for a slave update module to complete installation of update version data for its corresponding node, the master update module checks to see if the networked virtualization environment is capable of tolerating unavailability of data at the corresponding node during completion of the installation, which will be described in greater detail below.

Leadership election may take place at various different points in time. For example, leadership election may take place upon initialization of the networked virtualization environment for storage management, upon the addition/deletion of a node, or upon the failure or unavailability of a node.

For purposes of example, we will assume that the leadership election process takes place amongst the update modules in the networked virtualization environment for storage management prior to the receipt of update data and the start of the rolling update.

A node within the networked virtualization environment for storage management then receives update data as shown at 303. An administrator of the networked virtualization environment may provide the update data to the node. The update data may include updates, patches, or additional features for improving the storage management functionality provided to user VMs in the networked virtualization environment for storage management.

The node to which the update data is provided may be any node within the networked virtualization environment, and need not be the node at which the master update module resides. The update module of the controller VM for the node may receive the update data.

Upon receiving the update data, the update module for the node stores the update data at a storage device local to the node (e.g., SSD). The update module then updates the configuration data to indicate the existence of update data as shown at 305. Where the update module has direct access to the configuration data, the update module may directly update the configuration data to indicate the existence of update data. Where the update module has indirect access to the configuration data, the update module may update the configuration data to indicate the existence of update data through the distributed configuration database module.

Because the distributed configuration database modules residing at each node within the networked virtualization environment are in communication with each other, all of the remaining distributed configuration database modules in the networked virtualization environment also update their copies of the configuration data to indicate the existence of update data. An update module for each node may then recognize the existence of update data as shown at 307. The update module at each node may recognize the existence of update data by accessing its configuration data either directly or through its corresponding distributed configuration database module.

Once an update module at a node in the networked virtualization environment recognizes the existence of a update data, it acquires the update data as shown at 309. In some embodiments, the update module may simply consult the configuration data to identify the location of the update data. In other embodiments, an update module may iterate through other nodes in the networked virtualization environment until it locates the update data. Once the update module has located the update data, it may acquire a copy of the update data from the located node and store a copy of the update data locally.

After all of the nodes in the networked virtualization environment have acquired a copy of the update data, a rolling update of the networked virtualization environment may begin. Installation of the update data may be performed in two steps. The first installation step may be performed without requiring the node to shut down or restart. The second installation step requires the node to shut down or restart, potentially resulting in unavailability of data residing at that node during the installation step. Thus, it is important to ensure that all data within the networked virtualization environment for storage management is available during the rolling update.

Figure 4A:
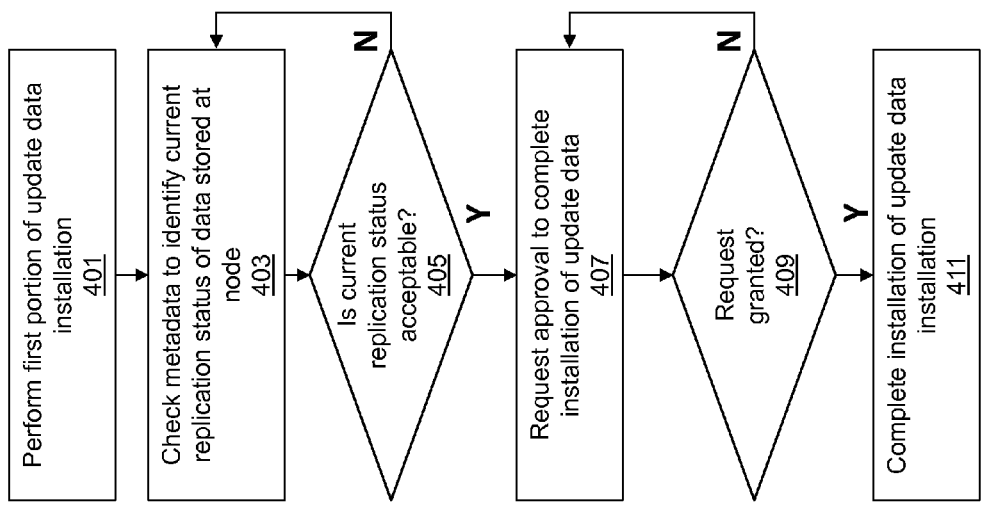
FIG. 4A is a flow diagram illustrating a method for completing installation of update data at a node in the networked virtualization environment from the perspective of a requesting update module.

FIG. 4A is a flow diagram illustrating a method for completing installation of update data at a node in the networked virtualization environment. FIG. 4A begins after the steps of FIG. 3 have been performed (e.g., node has local copy of update version data). FIG. 4A will describe the process for completing installation of update data for nodes where a slave update module resides. The node at which the master update module resides will complete installation of the update data after the nodes at which slave update modules reside have completed installation of the update data, which will be described in additional detail below.

The method for completing installation of update data at a node in the networked virtualization environment described in FIG. 4A will be described from the perspective of the update module residing at the node.

Initially the node performs a first portion of its update data installation as shown at 401. The update module of the controller VM for the node may perform this portion of the installation process. The first portion of the installation process performed at the node includes any portion of the installation process that does not require the node to shut down or be restarted. All nodes (including the node at which the master update module resides) in the networked virtualization environment for storage management may perform this portion of the installation process in parallel. Because this portion of the installation process does not require node shutdown or restart, it may be performed without first being granted approval by the master update module.

After performing the first portion of the update version data installation that does not require shut down or restart, the update module checks the metadata to identify the current replication status of data stored at the node as shown at 403. Because the metadata includes information for tracking and maintaining contents of the vDisks and vDisks blocks for the networked virtualization environment for storage management, the update module may identify the current replication status for data stored at its corresponding node by consulting the metadata.

The current replication status for data refers to the current number of copies of that data that is available within the networked virtualization environment. A piece of data stored at a node may have several copies residing at other nodes in order to facilitate disaster recovery and node failures. Each piece of data within the networked virtualization environment may be associated with a desired replication factor (e.g., a desired number of copies), in order to guard against potential data unavailability due to node failure.

Once the update module has identified the current replication status of data stored at its node, it makes a determination as to whether the current replications status is acceptable as shown at 405.

In making such a determination, the update module may first identify whether any piece of data residing locally at its corresponding node has a current replication factor that falls below the desired replication factor. For example, if the desired replication factor for data in the system is 3 (e.g., 3 copies), then the update module may identify whether any pieces of data have a current replication factor of 2 or less. In some embodiments, if the current replication factor of any piece of data residing at the node falls below the desired replication factor, then the update module may determine that the current replication status is unacceptable.

The update module may also optionally identify whether failure of the node is supportable even where pieces of data having a current replication factor less than the desired replication factor exist. For example, where a piece of data with the lowest current replication factor that is local to the node has a current replication factor of 2, the update module may determine that failure of the node is supportable because at least another copy of the piece of data will exist at another node. Here, the update module may conclude that the current replication status is acceptable even though a piece of data local to the node having the lowest current replication factor falls below the desired replication factor because at least one other copy of the piece of data exists elsewhere in the networked virtualization environment.

If the update module determines that the current replication status is unacceptable, the method returns to 403, where metadata is again checked to identify the current replication status of data stored at the node. This process continues until the update module determines that the current replication status of data stored at its corresponding node is acceptable.

If the update module determines that the current replication status is acceptable, then the update module requests approval to complete installation of the update data as shown at 407. The request is made for approval to perform the portion of the installation that requires the node to be shut down or restarted such that data local to the node may be unavailable during that portion of the installation process.

In requesting approval to complete installation of the update data, the requesting update module may attempt to acquire a token from the master update module for completing installation of the update data. The master update module may have one or more tokens which it grants to nodes within the networked virtualization environment for ensuring that only a prescribed number of nodes are being shut down or restarted at a time to complete the installation process. This is done to minimize or eliminate the possibility of data residing at a node undergoing restart/shutdown being unavailable.

If the master update module determines that it has one or more tokens available, it will grant the requesting update module the token. Otherwise, if the master update module determines that it does not have any tokens available, it will deny the requesting update modules request.

The requesting update module makes a determination as to whether its request to complete installation of the update data is granted as shown at 409.

If the request is denied, then the method returns to 407, where the update module again requests approval from the master update module to complete installation of the update data. This process continues until the update module receives approval to the complete installation of the update data from the master update module.

If the request is granted, then the requesting update module completes installation of the update data as shown at 411. Completing installation of the update data involves shutting down or restarting the node at which the requesting update module resides. Shut down or restarts of the node are permitted because the networked virtualization environment has already verified that copies of data local to the node reside elsewhere and are available while the node is down. After the update module completes installation of the update, it returns the token to the master update module such that other nodes in the system may be granted approval to complete installation of the update data.

Figure 4B:
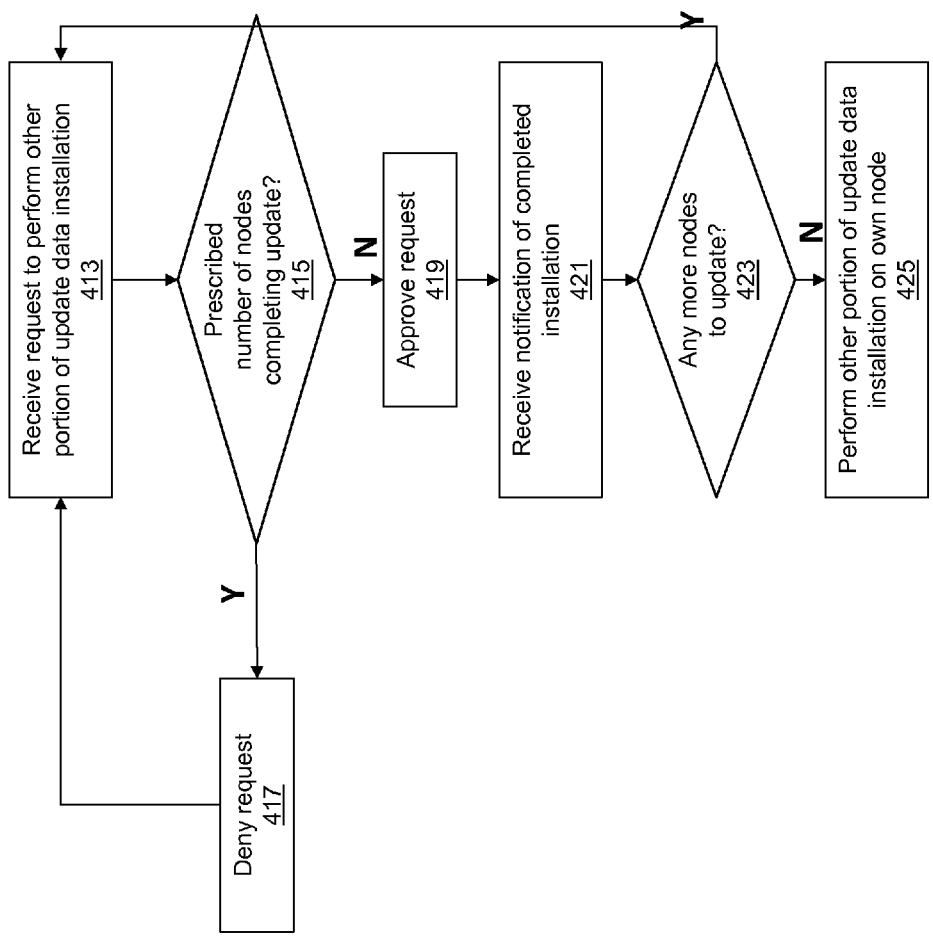
FIG. 4B is a flow diagram illustrating a method for completing installation of update data at a node in the networked virtualization environment from the perspective of a master update module.

FIG. 4B is a flow diagram illustrating a method for completing installation of update data for nodes in the networked virtualization environment from the perspective of the master update module. FIG. 4B begins after the steps of FIG. 3 have been performed (e.g., each node in the networked virtualization environment has a local copy of the update data) and illustrates the steps performed by the master update module in correspondence with the steps performed by the requesting update module in FIG. 4A.

Initially, the master update module receives a request for approval to complete installation of update data from a node in the networked virtualization environment as shown at 413. When the master update module receives a request, it first makes a determination as to whether a prescribed number of nodes in the networked virtualization environment are currently completing installation of the update data as shown at 415.

The master update module may make such a determination by simply identifying whether or not it has any tokens available. If the master update module determines that it has no tokens available, then the prescribed number of nodes in the networked virtualization environment currently completing installation of the update data has been met and the networked virtualization environment is unable to tolerate any additional nodes completing installation of the update data at the current time. If, instead the master update module determines that it has one or more tokens available, then the prescribed number of nodes in the networked virtualization environment currently completing installation of the update data has not yet been met and the networked virtualization environment is currently able to tolerate additional nodes completing installation of the update data.

Alternatively, where tokens are not used, the update module may consult its metadata or configuration data to identify the number of nodes in the networked virtualization environment currently completing installation of the update data and whether that number equals the prescribed number or falls below the prescribed number.

When the number of nodes in the networked virtualization environment currently completing installation of the update data equals the prescribed number, the networked virtualization environment is unable to tolerate any additional nodes completing installation of the update data at the current time and the master update module denies the requesting node's request as shown at 417. The master update module then returns to 413 where it waits to receive another request from a node to complete installation of update data.

When the number of nodes in the networked virtualization environment currently completing installation of the update data falls below the prescribed number, the networked virtualization environment is able to currently tolerate the requesting node completing installation of the update data and the master update module may approve the request as shown at 419.

In FIG. 4B, the master update module is not tasked with the responsibility of determining whether the current replication status of the requesting node is acceptable. Rather, it is the slave update module at the requesting node that is tasked with this responsibility, and only after the slave update module has determined that its current replications status is acceptable will it request to complete installation of update data. Thus, the master update module may simply grant approval to the requesting node upon determining that the number of nodes in the networked virtualization environment currently completing installation of the update data falls below the prescribed number.

After granting approval to the requesting node, the master update module waits to receive a notification of the completion of installation of the update data from the requesting node. In some embodiments, the master update module may simply wait to receive the token back from the requesting node after it completes installation of the update data. In other embodiments, the master update module may consult its metadata or configuration data to determine whether or not the requesting node has completed installation of the update data.

After receiving notification of the completion of installation of the update data from the requesting node as shown at 421, the master update module determines whether or not any additional nodes in the networked virtualization environment need to complete installation of update data as shown at 423. The master update module may determine whether or not any additional nodes other than its own corresponding node need to complete installation of the update data.

If the master update module determines that there are additional nodes that need to complete installation of the update data, then it returns to 413, where it waits to receive another request to complete installation for update data from another node.

If the master update module instead determines that there are no additional nodes that need to complete installation of the update data, then it completes installation of update data at its own node as shown at 425. In order for the master update module to complete installation of the update data at its own node, there must be another leadership election to elect a new master update module.

In alternative embodiments, the master update module may complete installation of the update data at its own node at any time. When the master update module completes installation of update data at its own node another leadership election is performed to elect a new master update module.

FIGS. 4A and 4B illustrate an embodiment where the update module of the node requesting approval to complete installation of the update version data performs the replication status check (e.g., data unavailability check). However, in other embodiments, the master update module may perform the replication status check (e.g., data unavailability check) rather than the requesting update module.

Figure 5A:
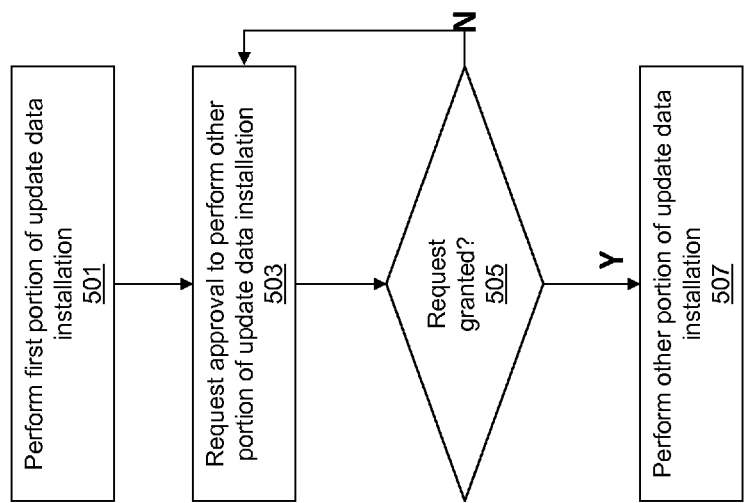
FIG. 5A is a flow diagram illustrating an alternative method for completing installation of update data at a node in the networked virtualization environment from the perspective of a requesting update module.

FIG. 5A is a flow diagram illustrating a method for completing installation of update data at a node in the networked virtualization environment. FIG. 5A illustrates the method for completing installation of update data where the master update module is tasked with the responsibility of determining whether the requesting node has an acceptable current replication status.

FIG. 5A also begins after the steps of FIG. 3 have been performed (e.g., node has local copy of update version data). Similarly, FIG. 5A will describe the process for completing installation of update data for nodes where a slave update module resides. The node at which the master update module resides completes installation of the update data after the nodes at which slave update modules reside have completed installation of the update data, which will be described in additional detail below.

The method for completing installation of update data at a node in the networked virtualization environment described in FIG. 5A will be described from the perspective of the update module residing at the node.

Initially the node performs a first portion of its update data installation as shown at 501. The update module of the controller VM for the node may perform this portion of the installation process. The first portion of the installation process performed at the node includes any portion of the installation process that does not require the node to shut down or be restarted. All nodes (including the node at which the master update module resides) in the networked virtualization environment for storage management may perform this portion of the installation process in parallel. Because this portion of the installation process does not require node shutdown or restart, it may be performed without first being granted approval by the leader update module.

After performing the first portion of the update version data installation that does not require shut down or restart, the update module requests approval from the master update module to complete installation of the update data as shown at 503.

In requesting approval to complete installation of the update data, the requesting update module may attempt to acquire a token from the master update module for completing installation of the update data. The master update module may have one or more tokens which it grants to nodes within the networked virtualization environment for ensuring that only a prescribed number of nodes are being shut down or restarted at a time to complete the installation process. This is done to minimize or eliminate the possibility of data residing at a node undergoing restart/shutdown being unavailable.

The method of FIG. 5A differs from the method in FIG. 4A in that the master update module is tasked with the responsibility of determining the current replication status of the requesting node and the acceptability of the current replication status rather than the update module at the requesting node. Thus, when the master update module receives a request to complete installation of update data from a slave update module, the master update module makes several different determinations before granting or denying the request.

If the master update module determines that it does not have any tokens available, it will deny the requesting update modules request without determining whether or not the replication status of the requesting node is acceptable.

Otherwise, if the master update module determines that it has one or more tokens available, it will next determine whether or not the current replication status of the requesting node is acceptable.

The master update module may first check its metadata to identify the current replication status of data stored at the requesting node. Because the metadata includes information for tracking and maintaining contents of the vDisks and vDisks blocks for the entire networked virtualization environment for storage management, the master update module may identify the current replication status for data stored at the requesting node by consulting its metadata.

The current replication status for data refers to the current number of copies of that data that is available within the networked virtualization environment. A piece of data stored at a node may have several copies residing at other nodes in order to facilitate disaster recovery and node failures. Each piece of data within the networked virtualization environment may be associated with a desired replication factor (e.g., a desired number of copies), in order to guard against potential data unavailability due to node failure.

Once the master update module has identified the current replication status of data stored at the requesting node, it makes a determination as to whether the current replications status of the requesting node is acceptable.

In making such a determination, the master update module may first identify whether any piece of data residing locally at the requesting node has a current replication factor that falls below the desired replication factor. For example, if the desired replication factor for data in the system is 3 (e.g., 3 copies), then the master update module may identify whether any pieces of data at the requesting node have a current replication factor of 2 or less. In some embodiments, if the current replication factor of any piece of data residing at the requesting node falls below the desired replication factor, then the master update module may determine that the current replication status is unacceptable and deny approval for completing installation of the update data to the requesting node The master update module may also optionally identify whether failure of the requesting node is supportable even where pieces of data at the requesting node having a current replication factor less than the desired replication factor exist. For example, where a piece of data with the lowest current replication factor that is local to the requesting node has a current replication factor of 2, the master update module may determine that failure of the requesting node is supportable because at least another copy of the piece of data will exist at another node in the networked virtualization environment. Here, the master update module may conclude that the current replication status is acceptable even though a piece of data local to the requesting node having the lowest current replication factor falls below the desired replication factor because, at least one other copy of the piece of data exists elsewhere in the networked virtualization environment.

If the master update module determines that the current replication status of the requesting node is unacceptable, then approval for completing installation of the update data is denied.

If instead the master update module determines that the current replication status of the requesting node is acceptable, then approval for completing installation of the update data is approved.

The requesting update module makes a determination as to whether its request to complete installation of the update data is granted as shown at 505.

If the request is denied, then the method returns to 503, where the update module again requests approval from the master update module to complete installation of the update data. This process continues until the update module receives approval to the complete installation of the update data from the master update module.

If the request is granted, then the requesting update module completes installation of the update data as shown at 507. Completing installation of the update data involves shutting down or restarting the node at which the requesting update module resides. Shut down or restarts of the node are permitted because the networked virtualization environment has already verified that copies of data local to the node reside elsewhere and are available while the node is down. After the update module completes installation of the update, it returns the token to the master update module such that other nodes in the system may be granted approval to complete installation of the update data.

Figure 5B:
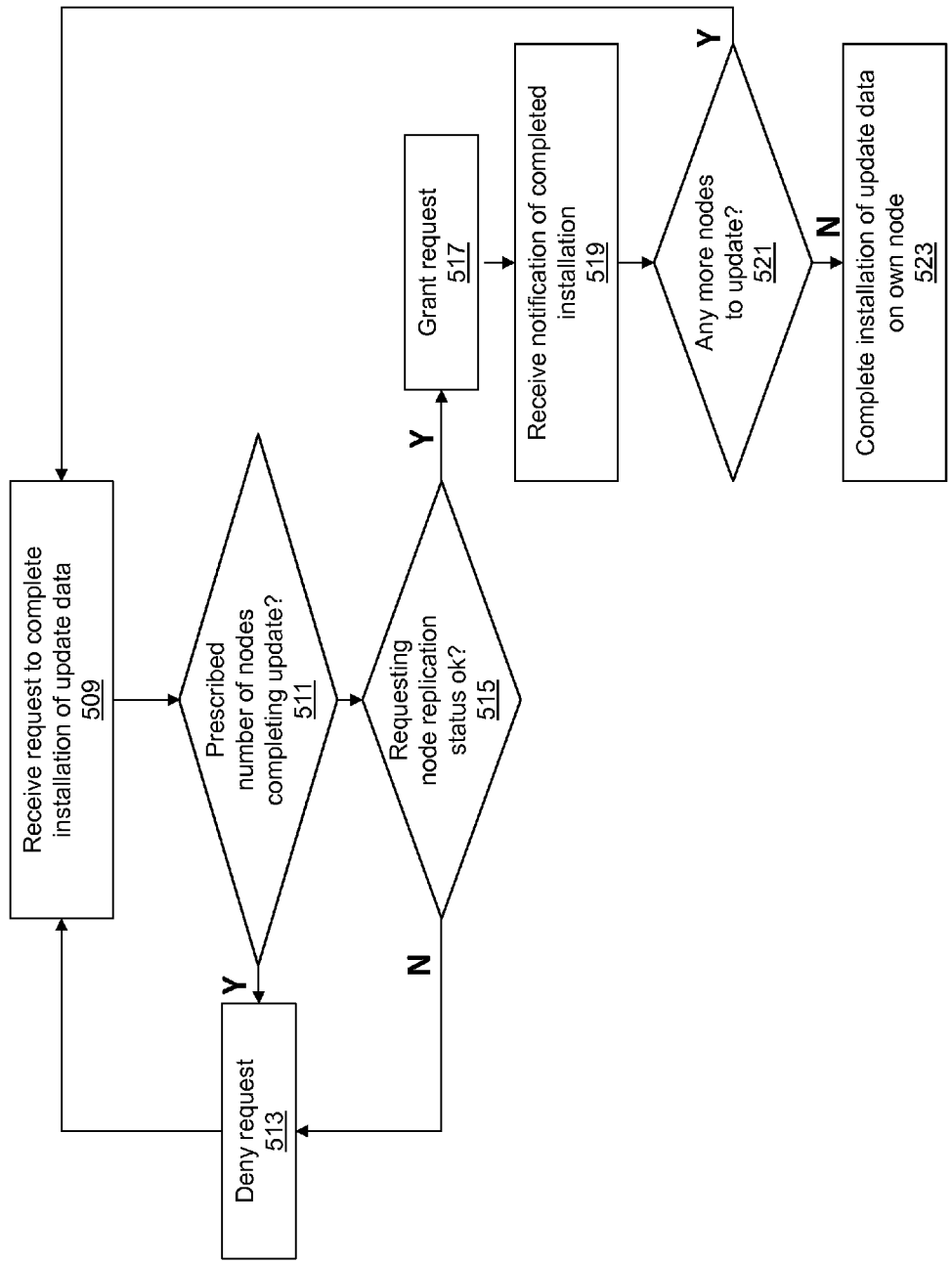
FIG. 5B is a flow diagram illustrating an alternative method for completing installation of update data at a node in the networked virtualization environment from the perspective of a master update module.

FIG. 5B is a flow diagram illustrating a method for completing installation of update data for nodes in the networked virtualization environment from the perspective of the master update module. FIG. 5B begins after the steps of FIG. 3 have been performed (e.g., each node in the networked virtualization environment has a local copy of the update data) and illustrates the steps performed by the master update module in correspondence with the steps performed by the requesting update module in FIG. 5A.

Initially, the master update module receives a request for approval to complete installation of update data from a node in the networked virtualization environment as shown at 509. When the master update module receives a request, it first makes a determination as to whether a prescribed number of nodes in the networked virtualization environment are currently completing installation of the update data as shown at 511.

The master update module may make such a determination by simply identifying whether or not it has any tokens available. If the master update module determines that it has no tokens available, then the prescribed number of nodes in the networked virtualization environment currently completing installation of the update data has been met and the networked virtualization environment is unable to tolerate any additional nodes completing installation of the update data at the current time. If, instead the master update module determines that it has one or more tokens available, then the prescribed number of nodes in the networked virtualization environment currently completing installation of the update environment is currently able to tolerate additional nodes completing installation of the update data.

Alternatively, where tokens are not used, the update module may consult its metadata or configuration data to identify the number of nodes in the networked virtualization environment currently completing installation of the update data and whether that number equals the prescribed number or falls below the prescribed number.

When the number of nodes in the networked virtualization environment currently completing installation of the update data equals the prescribed number, the networked virtualization environment is unable to tolerate any additional nodes completing installation of the update data at the current time and the master update module denies the requesting node's request as shown at 513. The master update module then returns to 501 where it waits receives another request from a node to complete installation of update data.

When the number of nodes in the networked virtualization environment currently completing installation of the update data falls below the prescribed number, the networked virtualization environment is able to currently tolerate the requesting node completing installation of the update data.

After determining that the networked virtualization environment is able to currently tolerate the requesting node completing installation of the update data, the master update module may then determine whether the current replication status of the requesting node is acceptable as shown at 515.

The master update module may first check its metadata to identify the current replication status of data stored at the requesting node. Because the metadata includes information for tracking and maintaining contents of the vDisks and vDisks blocks for the entire networked virtualization environment for storage management, the master update module may identify the current replication status for data stored at the requesting node by consulting its metadata.

Once the master update module has identified the current replication status of data stored at the requesting node, it makes a determination as to whether the current replications status of the requesting node is acceptable.

In making such a determination, the master update module may first identify whether any piece of data residing locally at the requesting node has a current replication factor that falls below the desired replication factor. For example, if the desired replication factor for data in the system is 3 (e.g., 3 copies), then the master update module may identify whether any pieces of data at the requesting node have a current replication factor of 2 or less. In some embodiments, if the current replication factor of any piece of data residing at the requesting node falls below the desired replication factor, then the master update module may determine that the current replication status is unacceptable and deny approval for completing installation of the update data to the requesting node The master update module may also optionally identify whether failure of the requesting node is supportable even where pieces of data at the requesting node having a current replication factor less than the desired replication factor exist. For example, where a piece of data with the lowest current replication factor that is local to the requesting node has a current replication factor of 2, the master update module may determine that failure of the requesting node is supportable because at least another copy of the piece of data will exist at another node in the networked virtualization environment. Here, the master update module may conclude that the current replication status is acceptable even though a piece of data local to the requesting node having the lowest current replication factor falls below the desired replication factor because, at least one other copy of the piece of data exists elsewhere in the networked virtualization environment.

If the master update module determines that the current replication status of the requesting node is unacceptable, then approval for completing installation of the update data is denied as shown at 513, and the master update module returns to 509 where it waits to receive another request to complete installation of update data from a node in the networked virtualization environment.

If instead the master update module determines that the current replication status of the requesting node is acceptable, then approval for completing installation of the update data is granted as shown at 517.

After granting approval to the requesting node, the master update module waits to receive a notification of the completion of installation of the update data from the requesting node. In some embodiments, the master update module may simply wait to receive the token back from the requesting node after it completes installation of the update data. In other embodiments, the master update module may consult its metadata or configuration data to determine whether or not the requesting node has completed installation of the update data.

After receiving notification of the completion of installation of the update data from the requesting node as shown at 519, the master update module determines whether or not any additional nodes in the networked virtualization environment need to complete installation of update data as shown at 521. The master update module may determine whether or not any additional nodes other than its own corresponding node need to complete installation of the update data.

If the master update module determines that there are additional nodes that need to complete installation of the update data, then it returns to 509, where it waits to receive another request to complete installation for update data from another node.

If the master update module instead determines that there are no additional nodes that need to complete installation of the update data, then it completes installation of update data at its own node as shown at 523. In order for the master update module to complete installation of the update data at its own node, there must be another leadership election to elect a new master update module.

System Architecture

Figure 6:
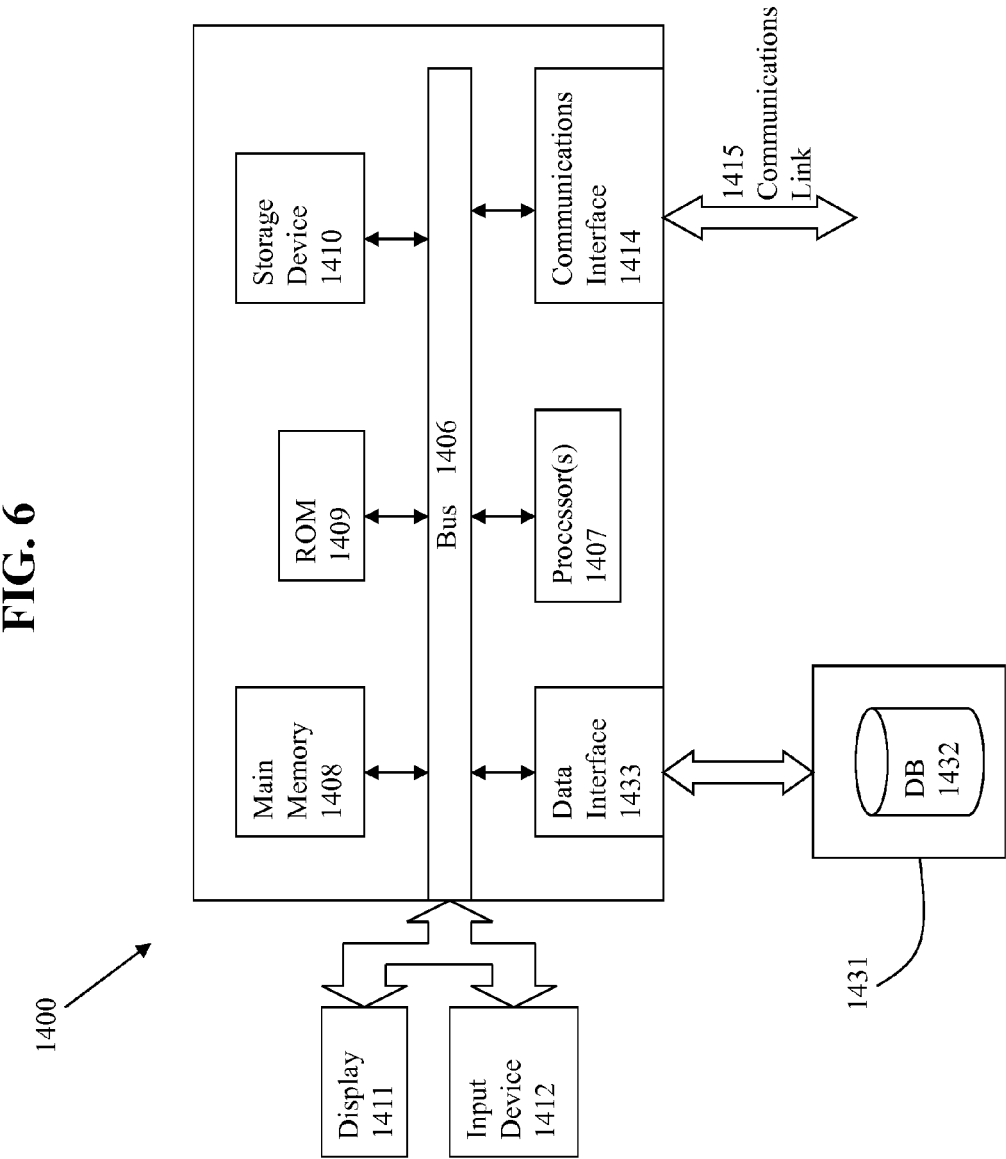
FIG. 6 is a block diagram of an illustrative computing system suitable for implementing an embodiment of the present invention

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for performing rolling updates with data unavailability checks in a networked virtualization environment for storage management, comprising:

performing a leadership election amongst controller virtual machines distributed across a cluster of nodes in the networked virtualization environment to elect a controller virtual machine from amongst the controller virtual machines as a master controller virtual machine, the cluster of nodes being implemented as a networked virtualization environment, wherein controller virtual machines not elected are slave controller virtual machines, the controller virtual machines managing access by the cluster of nodes to a global storage pool comprising a plurality of storage devices distributed across the cluster of nodes, wherein any node distributed across the cluster of nodes that has a controller virtual machine utilizes its respective controller virtual machine to read and write to the plurality of storage devices in the global storage pool;

acquiring update data by a node from among the cluster of nodes, wherein any node in the cluster of nodes having a controller virtual machine is capable of initially acquiring the update data on behalf of the cluster of nodes for distribution to the cluster of nodes in the networked virtualization environment, wherein update data information to identify an existence of update data to all nodes is stored in a global storage pool accessible by any node distributed across the cluster of nodes that has a controller virtual machine, including a node having the master controller virtual machine;

determining whether a replication status at the node in the networked virtualization environment is acceptable by the master controller virtual machine or a corresponding slave controller virtual machine; and granting approval to complete installation of the update data at the node in the networked virtualization environment by the master controller virtual machine when the replication status at the node is acceptable.

2. The method of claim 1, wherein acquiring update data comprises:
receiving the update data at a first node;
updating configuration data for the networked virtualization environment by the first node to indicate existence of the update data;
recognizing the existence of the update data by one or more other nodes in the networked virtualization environment; and
acquiring the update data by the one or more other nodes.

3. The method of claim 2, wherein acquiring the update data by the one or more other nodes comprises identifying a location of the update data by consulting the configuration data.

4. The method of claim 2, wherein acquiring the update data by the one or more other nodes comprises iterating through the nodes in the networked virtualization environment until the update data is located.

5. The method of claim 1, wherein determining whether the replication status at the node in the networked virtualization environment is acceptable is performed by the master controller virtual machine.

6. The method of claim 5, wherein the master controller virtual machine determines whether the replication status of the node in the networked virtualization environment is acceptable by checking metadata.

7. The method of claim 6, wherein the replication status of the node is acceptable when a current replication factor for data at the node meets a desired replication factor.

8. The method of claim 6, wherein the replication status of the node is acceptable when failure of the node is supportable.

9. The method of claim 1, wherein determining whether the replication status at the node in the networked virtualization environment is acceptable is performed by the corresponding slave controller virtual machines.

10. The method of claim 9, wherein the corresponding slave controller virtual machine determines whether a replication status of its corresponding node is acceptable by checking metadata.

11. The method of claim 10, wherein the replication status of the node is acceptable when a current replication factor for data at the node meets a desired replication factor.

12. The method of claim 1, wherein granting approval to complete installation of the update data at the node in the networked virtualization environment by the master controller virtual machine comprises providing a token to the node for completing installation.

13. The method of claim 1, wherein completing installation of the update data at a node at which the master controller virtual machine resides causes another leadership election process to be performed.

14. The method of claim 1, wherein completing installation of the update data at the node in the networked virtualization environment requires data residing at the node to be unavailable for a period of time.

15. A computer program product embodied on a non-transitory computer readable medium, the non-transitory computer readable medium having stored thereon a sequence of instructions which, when executed by a processor causes the processor to execute a method for performing rolling updates with data unavailability checks in a networked virtualization environment for storage management, comprising:

performing a leadership election amongst controller virtual machines distributed across a cluster of nodes in the networked virtualization environment to elect a controller virtual machine from amongst the controller virtual machines as a master controller virtual machine, the cluster of nodes being implemented as a networked virtualization environment, wherein controller virtual machines not elected are slave controller virtual machines, the controller virtual machines managing access by the cluster of nodes to a global storage pool comprising a plurality of storage devices distributed across the cluster of nodes, wherein any node distributed across the cluster of nodes that has a controller virtual machine utilizes its respective controller virtual machines to read and write to the plurality of storage devices in the global storage pool;

acquiring update data by a node from among the cluster of nodes, wherein any node in the cluster of nodes having a controller virtual machine is capable of initially acquiring the update data on behalf of the cluster of nodes for distribution to the cluster of nodes in the networked virtualization environment, wherein update data information to identify an existence of update data to all nodes is stored in a global storage pool accessible by any node distributed across the cluster of nodes that has a controller virtual machine, including a node having the master controller virtual machine;

determining whether a replication status at a node in the networked virtualization environment is acceptable by the master controller virtual machine or a corresponding slave controller virtual machine; and granting approval to complete installation of the update data at the node in the networked virtualization environment by the master controller virtual machine when the replication status at the node is acceptable.

16. The computer program product of claim 15, wherein acquiring the update data comprises:
receiving the update data at a first node;
updating configuration data for the networked virtualization environment by the first node to indicate existence of the update data;
recognizing the existence of the update data by one or more other nodes in the networked virtualization environment; and
acquiring the update data by the one or more other nodes.

17. The computer program product of claim 16, wherein acquiring the update data by the one or more other nodes comprises identifying a location of the update data by consulting the configuration data.

18. The computer program product of claim 16, wherein acquiring the update data by the one or more other nodes comprises iterating through the nodes in the networked virtualization environment until the update data is located.

19. The computer program product of claim 15, wherein determining whether the replication status at the node in the networked virtualization environment is acceptable is performed by the master controller virtual machine.

20. The computer program product of claim 19, wherein the master controller virtual machine determines whether the replication status of the node in the networked virtualization environment is acceptable by checking metadata.

21. The computer program product of claim 20, wherein the replication status of the node is acceptable when a current replication factor for data at the node meets a desired replication factor.

22. The computer program product of claim 20, wherein the replication status of the node is acceptable when failure of the node is supportable.

23. The computer program product of claim 15, wherein determining whether the replication status at the node in the networked virtualization environment is acceptable is performed by the corresponding slave controller virtual machine.

24. The computer program product of claim 23, wherein the corresponding slave controller virtual machine determines whether a replication status of its corresponding node is acceptable by checking metadata.

25. The computer program product of claim 24, wherein the replication status of the node is acceptable when a current replication factor for data at the node meets a desired replication factor.

26. The computer program product of claim 15, wherein granting approval to complete installation of the update data at the node in the networked virtualization environment by the master controller virtual machine comprises providing a token to the node for completing installation.

27. The computer program product of claim 15, wherein completing installation of the update data at a node at which the master controller virtual machine resides causes another leadership election process to be performed.

28. The computer program product of claim 15, wherein completing installation of the update data at the node in the networked virtualization environment requires data residing at the node to be unavailable for a period of time.

29. A system for performing rolling updates with data unavailability checks in a networked virtualization environment for storage management, comprising:
a computer processor to execute a set of program code instructions;
a memory to hold the set of program code instructions, in which the set of program code instructions comprises program code to perform:
performing a leadership election amongst controller virtual machines distributed across a cluster of nodes in the networked virtualization environment to elect a controller virtual machine from amongst the controller virtual machine as a master controller virtual machine, the cluster of nodes being implemented as a networked virtualization environment, wherein controller virtual machines not elected are slave controller virtual machines, the controller virtual machines managing access by the cluster of nodes to a global storage pool comprising a plurality of storage devices distributed across the cluster of nodes, wherein any node distributed across the cluster of nodes that has a controller virtual machine utilizes its respective controller virtual machines to read and write to the plurality of storage devices in the global storage pool;
acquiring update data by a node from among the cluster of nodes, wherein any node in the cluster of nodes having a controller virtual machine is capable of initially acquiring the update data on behalf of the cluster of nodes for distribution to the cluster of nodes in the networked virtualization environment, wherein update data information to identify an existence of update data to all nodes is stored in a global storage pool accessible by any node distributed across the cluster of nodes that has a controller virtual machine, including a node having the master controller virtual machine;
determining whether a replication status at a node in the networked virtualization environment is acceptable by the master controller virtual machine or a corresponding slave controller virtual machine; and
granting approval to complete installation of the update data at the node in the networked virtualization environment by the master controller virtual machine when the replication status at the node is acceptable.

30. The system of claim 29, wherein acquiring the update data comprises:
receiving the update data at a first node;
updating configuration data for the networked virtualization environment by the first node to indicate existence of the update data;
recognizing the existence of the update data by one or more other nodes in the networked virtualization environment; and
acquiring the update data by the one or more other nodes.

31. The system of claim 30, wherein acquiring the update data by the one or more other nodes comprises identifying a location of the update data by consulting the configuration data.

32. The system of claim 30, wherein acquiring the update data by the one or more other nodes comprises iterating through the nodes in the networked virtualization environment until the update data is located.

33. The system of claim 29, wherein determining whether the replication status at the node in the networked virtualization environment is acceptable is performed by the master controller virtual machine.

34. The system of claim 33, wherein the master controller virtual machine determines whether the replication status of the node in the networked virtualization environment is acceptable by checking metadata.

35. The system of claim 34, wherein the replication status of the node is acceptable when a current replication factor for data at the node meets a desired replication factor.

36. The system of claim 34, wherein the replication status of the node is acceptable when failure of the node is supportable.

37. The system of claim 29, wherein determining whether the replication status at the node in the networked virtualization environment is acceptable is performed by the corresponding slave controller virtual machine.

38. The system of claim 37, wherein the corresponding slave controller virtual machine determines whether a replication status of its corresponding node is acceptable by checking metadata.

39. The system of claim 38, wherein the replication status of the node is acceptable when a current replication factor for data at the node meets a desired replication factor.

40. The system of claim 29, wherein granting approval to complete installation of the update data at the node in the networked virtualization environment by the master controller virtual machine comprises providing a token to the node for completing installation.

41. The system of claim 29, wherein completing installation of the update data at a node at which the master controller virtual machine resides causes another leadership election process to be performed.

42. The system of claim 29, wherein completing installation of the update data at the node in the networked virtualization environment requires data residing at the node to be unavailable for a period of time.

* * * * *